SOCKET FOR SUBMINIATURE ELECTRONIC DEVICES

Filed Jan. 8, 1968

INVENTOR,
JOHN H. SMITH.

BY Melton M. Davis
Harry M. Saragovitz,
Edward J. Kelly & Herbert Berl
ATTORNEYS United States Patent Office 3,449,707
Patented June 10, 1969

3,449,707
SOCKET FOR SUBMINIATURE ELECTRONIC DEVICES

John H. Smith, Shrewsbury, N.J., assignor to the United States of America as represented by the Secretary of the Army Filed Jan. 8, 1968, Ser. No. 696,166
Int. Cl. H01r *3/00*
U.S. Cl. 339—147 2 Claims

ABSTRACT OF THE DISCLOSURE

The invention herein relates broadly to a socket for containing and confining electronic components and specifically directed to a means for confining and connecting subminiature components by a solderless technique which contemplates the use of a spring holder of spider-like configuration for securing in position subminiature devices such as photo-diodes, either singly or in combination, within a base of extremely thin proportions.

The invention described herein may be manufactured, used, and licensed by or for the Government for governmental purposes without payment to me of any royalty thereon.

*Background of the invention*

With the increased useage of miniature and subminiature circuitry in electronic systems, one of the many problems arising has been the provision of a secure, inexpensive and easily assembled confining means for electrically connecting components necessary for operation within the system. This has been particularly evident in those instances where it was necessary to install and confine such a component as a subminiature photo-diode, to which this invention and application is particularly directed, though not limited thereto. Heretofore several techniques have been suggested for accomplishing such result. One suggested method purposes the soldering practice of securing a miniature component within a baseboard. In some aspects this has been found deficient in that the heat required for the soldering operation could adversely affect and possibly destroy a device such as a photo-diode. Another suggested technique, to avoid the use of soldered connections, proposed the use of generally U-shaped clips, typical of which is shown in Roswell Patent 2,968,780. Experience has shown that such clips, when securing subminiature components, do on occasions become loose by jarring, lose some resiliency after repeated use and consume vital space in assemblies where the space factor may be a critical element.

*Summary of the invention*

The present invention is designed to overcome the above noted limitations that are common to many of the prior art sockets and confining devices. Toward this end the invention herein contemplates the use of a novel spring means of spider-like configuration utilized for the installation, retaining and electrically connecting of subminiature components, such as a photo-diode, within a supporting body.

A further object of the invention is to provide a means for confining such components that utilizes no heating operation.

Another object of the invention is to provide a securing means for such components that allows for the rapid installation and ready replacement when necessary.

Another object of the invention is to provide a socket that will insure contact reliability between the component confined and its associated component.

*Brief description of the drawing*

Numerous other objects and advantages of the invention, not at this time enumerated, will be apparent from a consideration of the following detailed description, read in view of the drawing in which.

*Description of the preferred embodiment*

Figures 1, 3, 4:
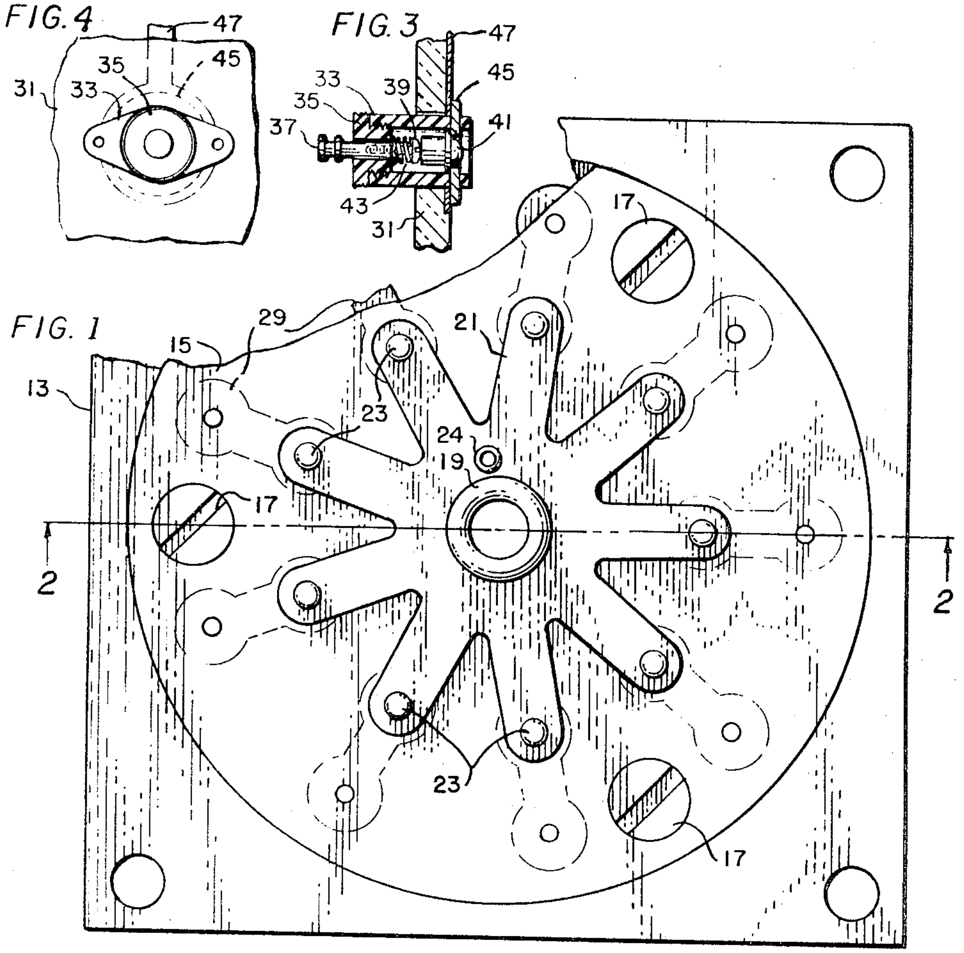
FIG. 1 is a plan view, and partially cut away, of the confining socket embodying the features of the invention.
FIG. 3 is a view in section of a modified form of the invention.
FIG. 4 is a plan view of the device shown in FIG. 3.
Figure 2:
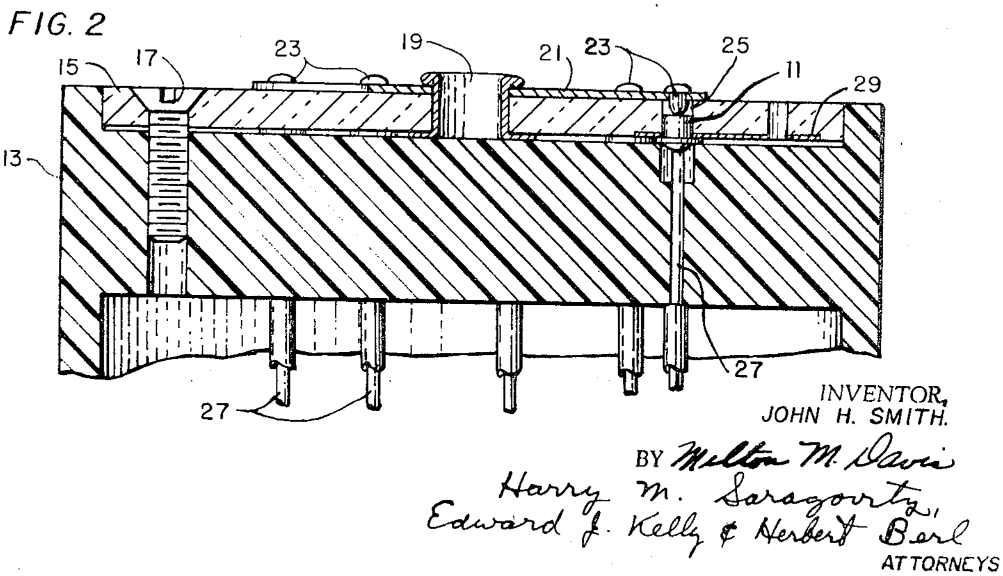
FIG. 2 is a view in section taken on the line A—A of FIG. 1.

In the drawing, reference is made to FIGS. 1 and 2 which portray one specific embodiment of the invention wherein the spider spring is utilized as a confining and connecting means for a subminiature photo-diode within an extremely thin substrate, said photo-diode being shown at 11. For its application within a specific system there is provided a supporting base 13 which is provided with a circular recess to accommodate a substrate 15. The substrate 15 is securely held within the recess of the base by threaded bolts, such as shown at 17. The substrate 15 is provided with a central opening within which is rigidly contained a hub ring 19 and a plurality of circumferentially disposed openings 25 within which the photo-diodes are confined. The ring 19 serves as a means for securing a spring 21 of spider configuration which serves to contain and confine the photo-diode 11 within the substrate. The spider 21 is made of a springy metal and is centrally secured by the ring 19, thereby permitting a flexing at the terminal ends of each of the legs of the spider. Each leg, at its terminal end, is provided with a metal rivet 23 positioned perpendicular and transverse thereto which engages the photo-diode 11 to maintain the photo-diode firmly positioned and held within the openings 25. In the particular embodiment shown the photo-diodes 11 are shown connected to fiber optics element 27. A common ground lead may be connected to a terminal in spider 21 such as shown at 24. The respective positive terminals for each of the diodes may be applied to contacts 29 on the underside of the substrate.

In FIG. 3 there is shown a modification of the invention in its application for the confining and electrically contacting a single component rather than a plurality as heretofore described. For such use there is shown a base 31 within which is contained a plastic socket 33 that is internally threaded to accommodate the threaded cap 35. Extending through a central aperture in the cap 35 is a post 37, the inner or confined end of which is provided with a captive screw 39. The free end or head of the screw 39 engages and contacts a photo-diode 41. Intermediate the photo-diode and the inner base of the cap 35, and surrounding the screw, is a spring 43. The lens side of the photo-diode is contained within a copper washer 45 superimposed on the printed surface, and which also serves for contacting the plus terminal of the photo-diode, of a printed circuit board 47.

What is claimed is:

1. In an electronic system that includes a base and a substrate thereon having a plurality of openings therein, means for confining and electrically contacting a subminiature component in each of said openings, comprising a flat spring member having a portion secured to the substrate and a plurality of spring fingers that terminate in a rivet dependent from and perpendicular to the surface of the finger, said spring fingers extending from the secured portion of the spring member and wherein the terminal ends of said fingers and its associated rivet engage in the openings in said substrate to confine and contact a component therein.

2. A device of the kind set forth in claim 1 wherein said spring member is of spider configuration having its central portion secured to said substrate.

References Cited

UNITED STATES PATENTS

| | | | |
|---|---|---|---|
| 3,022,447 | 2/1962 | Henss | 339—147 X |
| 3,314,042 | 4/1967 | Gabrielian | 339—17 X |

RICHARD E. MOORE, *Primary Examiner.*